[11] 3,621,181

| [72] | Inventor | Charles Gilbert Young<br>Storrs, Conn. |
| --- | --- | --- |
| [21] | Appl. No. | 850,514 |
| [22] | Filed | Aug. 15, 1969 |
| [45] | Patented | Nov. 16, 1971 |
| [73] | Assignee | American Optical Corporation<br>Southbridge, Mass. |

[54] LASER PATTERN GENERATOR
10 Claims, 8 Drawing Figs.

[52] U.S. Cl. .................................................. 219/121 L,
    331/94.5
[51] Int. Cl. .................................................. H01s 3/02,
    B23k 11/00
[50] Field of Search.................................................. 219/121 L;
    331/94.5; 128/395, 396, 397, 398; 350/96 R

[56] References Cited
UNITED STATES PATENTS

| 3,395,331 | 7/1968 | Snitzer | 331/94.5 X |
| --- | --- | --- | --- |
| 3,395,366 | 7/1968 | Snitzer | 331/94.5 |
| 3,421,097 | 1/1969 | Koester et al. | 331/94.5 |
| 3,289,101 | 11/1966 | Masters et al. | 219/121 L |
| 3,407,364 | 10/1968 | Turner | 331/94.5 |

*Primary Examiner*—J. V. Truhe
*Assistant Examiner*—Hugh D. Jaeger
*Attorneys*—William C. Nealon, Noble S. Williams, Robert J. Bird and Amster & Rothstein ABSTRACT: A system and construction for spot welding either in an industrial environment or for repairing retina detachments in the medical field is disclosed as comprising a fagot-laser system with each individual rod including an output end face whose normal is not colinear to the main axis of the rod. Various patterns can be generated with the arrangement by imaging the near field of the output at the laser rod ends onto the work piece or target at the desired magnification and rearranging or rotating the individual rods. An alternative arrangement is to image the far field onto the work at the desired magnification and to rotate the individual rod elements to achieve pattern variation.

PATENTED NOV 16 1971        3,621,181
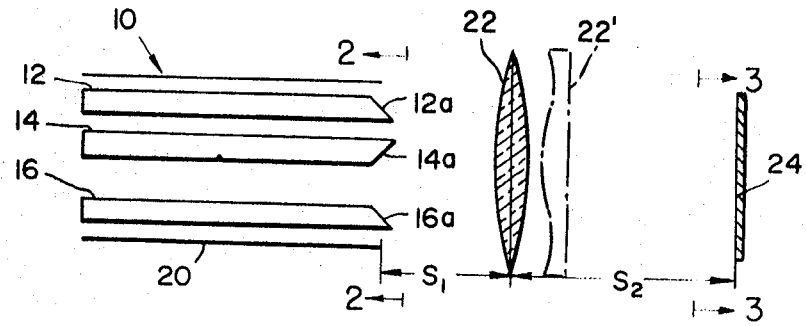
FIG. 1
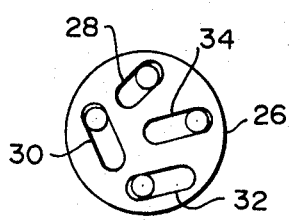  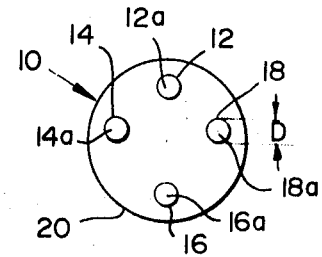  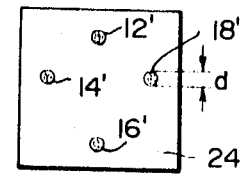
FIG. 2A        FIG. 2        FIG. 3
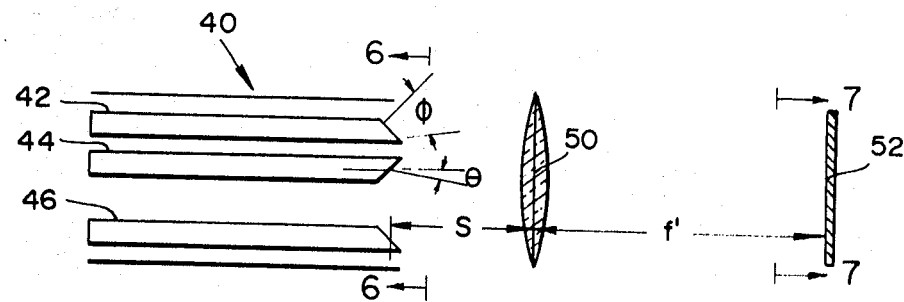
FIG. 5
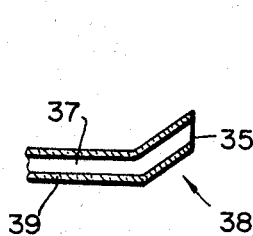  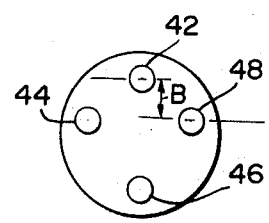  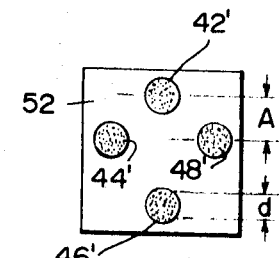
FIG. 4        FIG. 6        FIG. 7
INVENTOR.
C. GILBERT YOUNG
BY
*Amster & Rothstein*
ATTORNEY

LASER PATTERN GENERATOR

LASER PATTERN GENERATOR

1. Field of the Invention

This invention relates primarily to lasers and more particularly to a fagot laser arrangement for producing spot welds.

2. Prior Art

In order to obtain a sufficient radiant energy density for welding at a spot, a high power radiance source is essential and the development of lasers has made such sources available.

Conventional lasers capable of producing sufficient energy density for metallic or other welding operations generally operate with multimode oscillations, and the dimensions of their resonant cavities are large compared with the wave length of emitted radiation. Thus, the output beams of such devices cannot be focused onto a spot as small as necessary for microscopic spot welding or for medical applications. Furthermore, in presently used laser-welding systems, one is confined to the pattern dictated by the structure. The development of the fagot-laser system employing a number of small diameter rods in a single laser cavity has partially overcome this problem by making it convenient to form various patterns for the output by removing one or more elements from the system. However, one still finds that with such a fagot system, he is unable to choose welding patterns that involve the necessity for output in the spaces between the laser elements.

SUMMARY OF THE INVENTION

Accordingly, a primary object of the present invention is to provide a laser construction capable of microscopic multispot welding that is versatile in the pattern that may be generated.

A further object is to provide such a system which produces the required radiant energy density for metallic welding or welding of detached retinas.

These and other objects are accomplished in one preferred embodiment of the present invention which features a multirod fagot-laser construction with each rod having an output end face whose normal is not colinear with the main axis of the rod and with each rod being rotatable and/or movable. Optical means are provided adjacent the output end of the rod to image the near field of the pattern generated by the fagot-laser arrangement onto the work at the desired magnification. Pattern variations are obtainable by rearrangement of the individual rods or rotation of the rods. An alternative embodiment features a system for imaging the far field of the oblique output ends of the fagot rods onto a welding target. In that embodiment the direction of laser emission is altered by rotation of individual rods to change the position of the corresponding spots on the target. Also the size of the spots on the target are altered by changing the beam spread of individual rods by the adjustment of length or end reflectivity of the rods.

BRIEF DESCRIPTION OF THE DRAWINGS

Other objects, features and advantages of the present invention and its construction will become apparent by reference to the following more detailed description in conjunction with the drawings, in which:

FIG. 1 is a side view schematic representation of a near field imaging fagot-laser arrangement for welding according to the present invention;

FIG. 2 is a sectional view of the arrangement of FIG. 1, taken along line 2—2 of FIG. 1, showing the details of the array of output ends of the fagot rods;

FIG. 2A is an end view of the resonant cavity showing a construction for altering the position of individual rods;

FIG. 3 is a sectional view of the arrangement of FIG. 1, taken along the line 3—3 of FIG. 1, showing the details of the near field image on the target of FIG. 1;

FIG. 4 is an alternative embodiment of laser rod useful in the arrangement of FIG. 1;

FIG. 5 is a side view schematic representation of a far-field-imaging system for fagot rods according to an alternative embodiment of the present embodiment;

FIG. 6 is a sectional view of the arrangement of FIG. 5, taken along the line 6—6 thereof, showing the details of the array of output ends of the fagot rods; and FIG. 7 is a sectional view of the arrangement of FIG. 5, taken along the line 7—7 thereof, showing the fagot rod array output imaged on the far field target.

DETAILED DESCRIPTION OF A PREFERRED AND ALTERNATIVE EMBODIMENTS

Referring to the drawings, and particularly FIGS. 1–3, a fagot-laser arrangement, generally designated by the reference numeral 10, is shown as comprising individual laser rods 12, 14, 16, 18 in a suitable laser cavity 20, which also includes a conventional flash-tube assembly and appropriate electronics (not shown) and conventional end reflectors and other laser accessories (also not shown for the purposes of clarity and simplicity). It may be seen that the output ends 12a, 14a, 16a, 18a of the fagot rods are oblique to the main axes of the rods. Disposed at a distance $S_1$ from the output ends of the rods is a suitable lens 22 having a focal length $f$. The lens is for imaging the near field of the laser output at the output ends of the rods at a target 24 disposed at a distance $S_2$ from the lens 22. The target in the image plane of the lens is thereby impinged with images 12', 14', 16', 18' of the output from the rods.

Of course, it is contemplated that various arrangements of the array of fagot-laser rods may be used depending upon the welding problem, be it medical, metallic or another such welding task. For a given welding problem or set of problems it is convenient within the scope of the construction according to the present invention to provide a variable array of fagot rods. Variations in the image of the output of the array of rods are provided by changing the position of the individual rods by use of an output face 26 for the resonant cavity as shown, by way of example, in FIG. 2A. In such an arrangement, rods 28, 30, 32, 34 are used with suitable wedges or the like to reposition one or more of the rods, thereby enabling the variation in welding spots on the target. The following equation provides an explanation for the demagnification or magnification resulting from such changes in position: $d/D = S_2/f - 1$ where $1/f = 1/S_1 + 1/S_2$, $d$ = the target spot diameter, and $D$ = the spot diameter at the output of the rods.

In the near field system as described above, changes in the image pattern are also made by an astigmatic optical system (optical power difference between two planes of the lens) inserted to the light path, e.g. lens 22' shown by dot-dash outline in FIG. 1.

An alternative embodiment of the present invention for near field imaging would feature a rod according to FIG. 4 (a partial sectional view of the output end of the laser rod). In that FIG. laser rod 37, either unclad or clad with cladding 39, comprises a bent end 38 with the output face 35 being perpendicular to the main axis of the rod 37. A change in position of the images on the target 34 of FIG. 1 would then be accomplished by rotation of the individual rods, each of which is made according to the drawings of FIG. 4. The cladding 39 is a material of lower index of refraction than the material of the rod 37 in order to assist the rod in retaining the laser light as it is bent by the shape of the rod by the so-called fiber-optic effect. A further alternative embodiment would provide an end face 35 oblique to the main axis of the rod 37, still using the bent end for the rod. These alternative embodiments are useful also in the far field embodiments to be hereinafter described.

Alternatively, welding by use of a fagot-laser arrangement is illustrated for a far-field system by particular reference to FIGS. 5–7 wherein a fagot arrangement 40 is shown as including a number of fagot laser rods 42, 44, 46, 48. As in the preferred embodiment (near-field system) the individual rods are provided with oblique faces and the output of those rods at their output faces is imaged in the far field by use of the lens 50 disposed at a distance $S$ from the output faces of the rods. The target 52 is arranged in the focal plane of lens 50 at a distance $f$ from the lens. With this system, the imaging of the far field (transform of the angle of light output from the rods) is on the target 52 with the position of the individual targets 42′, 44′, 46′, 48′ being determined according to the following equation, where the distance between the target images is denoted by $A$, and the angle between the rod axes and the axes of the output beams are denoted by $\theta$:

$$A = f\theta.$$

The size of the spots are altered by altering the beam spread $\theta$. This size alteration is accomplished by altering the overall lengths of the individual rods or by adjusting reflectivity of an end surface of individual rods. It may be seen therefore that the size of the output spots 42, 44, 46, 48 in the array of FIG. 6 may be changed when they become target spots 42′, 44′, 46′, 48′ in the target array of FIG. 7. Furthermore, the distance between spots B of the array of FIG. 6 may be changed to a distance A in the target arrangement of FIG. 7.

In accordance with the construction along the lines of the above description a laser-welding apparatus is provided for use in various welding operations including metallic welding and various medical applications as well as machining and cutting operations. A controlled multiplicity of spots on the work (target) is provided by imaging the near field onto the work at the desired magnification with different patterns being obtainable by rearrangement of individual fagot rods or the interposition of separate optical elements between the rod ends and the work, or both. Also, by imaging the far field onto the work at a magnification, subject to control by varying beam spread and with a spot position determined by rotation of individual rod elements, the objectives of the present invention and the industrial purposes are accomplished. In all embodiments the individual rod elements are provided with an end face whose normal is not colinear with the main axis of the rod to enable the fulfillment of the purposes of the systems.

Other variations of the above described construction are accomplished by providing rods with bent ends or by using varying lengths of individual rod elements to make up By main body of the elements shown in FIG. 5. By providing conventional means to make these varying lengths replaceable, the beam spread of the individual rod outputs and thereby the size of the spots on the target 52 are changed. Furthermore, by replacing the individual lengths of rods, various end reflectivities on the replacements are used for changing beam spread and thereby spot size.

Also, it is contemplated that the fagot-laser system can be either an amplifier or an oscillator. As an amplifier, a separate laser oscillator would provide the energy and the necessity for providing individual output mirrors for the fagot rods is eliminated.

What is claimed is:

1. A laser construction for providing a highly intense, high dense and heat-emitting beam of output optical energy in a desired multiple spot pattern of adjustable size on a work target, said construction comprising a laser unit including a plurality of individual elongated laser rods, each of said rods having a main axis extending throughout the greater portion of the length of the rod and about which said rod may be rotated, and each rod having one of its end faces arranged to function as an output end face outwardly through which a laser beam is directed during operation of said unit, the output end faces of all of said rods being disposed at the same end of said unit in adjacent spaced side-by-side relation relative to each other, and lens means disposed between said work target and the output ends of said rods so as to image the output beams from each rod upon said work target, the output ends of each of said rods being so positioned and angularly disposed relative to the main axis of said rod as to laterally shift the output beam therefrom during rotation of said rods and thereby cause an inward or outward adjustment as desired of spots of said spot pattern on said target.

2. The invention according to claim 1 wherein said light output end faces of said rods are oblique to respective main axes of said rods.

3. The invention according to claim 1 wherein a short section of the length of each of said rods near its output end face is angularized to the main axis of the rod.

4. The invention according to claim 3 wherein said output end faces are disposed perpendicularly to respective main axes of the rods.

5. The invention according to claim 1 wherein said lens means is astigmatic.

6. The invention according to claim 1 wherein said lens means is disposed at a distance from said work target equal to the focal length of said lens means.

7. The invention according to claim 1 wherein the far field of the output of said laser unit is in the form of individual spots and is imaged by said lens means onto said work target and means is provided for individually rotating said laser rods about their respective axes to change the position of said spots relative to each other on said work target.

8. The invention according to claim 1 wherein the far field of the output of said laser unit is in the form of individual spots and is imaged by said lens means onto said work target and at least some of said laser rods are selected to be of individually different lengths to correspondingly alter the size of said spots on said work target.

9. The invention according to claim 3 wherein the near field of the output of said laser unit is in the form of individual spots and is imaged by said lens means onto said work target and means is provided for individually rotating said laser rods about their respective axes to change the position of said spots relative to each other on said work target.

10. The invention according to claim 1 wherein the near field of the output of said laser unit is in the form of individual spots and is imaged by said lens means onto said work target and means is provided for adjusting the position of said lens means to vary the size of said individual spots.

* * * * *